United States Patent [19]

Lively et al.

[11] Patent Number: 4,638,676

[45] Date of Patent: Jan. 27, 1987

[54] RECIPROCATING DRIVE MECHANISM WITH POSITIVE PINION-TO-RACK GEAR ENGAGEMENT

[75] Inventors: Gordon R. Lively, Longview; Jerry M. Lang, Lindale, both of Tex.

[73] Assignee: Rota-Flex Corporation, Longview, Tex.

[21] Appl. No.: 704,923

[22] Filed: Feb. 25, 1985

[51] Int. Cl.⁴ .................. F16H 21/16; F16H 19/08
[52] U.S. Cl. ........................................ 74/31; 74/71
[58] Field of Search ................... 74/29–31, 74/71–74

[56] References Cited

U.S. PATENT DOCUMENTS

| | | | |
|---|---|---|---|
| 264,483 | 9/1882 | Smith | 74/448 |
| 579,559 | 3/1897 | Bossert | 74/71 |
| 1,119,965 | 12/1914 | Kelly | 74/71 |
| 1,211,221 | 1/1917 | Pfeiffer | 74/71 |
| 1,540,707 | 6/1925 | Ormsbee | 74/30 |
| 1,598,553 | 8/1926 | Butler | 74/31 |
| 1,611,914 | 12/1926 | Jenkins | 74/30 |
| 1,917,201 | 7/1933 | Bornstein | 74/31 |
| 2,091,287 | 8/1937 | Leonard | 74/71 |
| 2,136,478 | 10/1938 | Travis | 74/31 |
| 2,170,313 | 8/1939 | Whittlesey | 74/41 |
| 2,200,292 | 5/1940 | Patterson | 74/30 |
| 2,510,082 | 1/1950 | Davey | 74/31 |
| 2,732,722 | 1/1956 | Wilshusen | 74/31 |
| 2,821,861 | 2/1958 | Dunn | 74/30 |
| 4,430,902 | 2/1984 | McClure | 74/31 |

*Primary Examiner*—Lawrence Staab
*Attorney, Agent, or Firm*—Roylance, Abrams, Berdo & Goodman

[57] ABSTRACT

A reciprocating drive mechanism powered by a rotating prime mover for use, for example, in operating oil well pumps. The drive mechanism utilizes a rotating pinion meshing with an endless arcuate rack gear to convert rotation to reciprocation and includes an assembly to provide a positive engagement between the pinion and rack gear. The prime mover is coupled to a fixed input shaft, the input shaft has the pinion coupled thereto, and an endless arcuate rack gear is rigidly coupled to an output shaft and meshes with the pinion. An arcuate cam is rigidly coupled to the arcuate rack gear and is engaged by a pair of cam followers which are also coupled to the pinion. A transmission shaft, which supports the pinion and cam followers, is parallel to and located a fixed distance from the input shaft, thereby maintaining the cam followers in positive engagement with the cam and the pinion in positive engagement with the rack gear.

14 Claims, 11 Drawing Figures

RECIPROCATING DRIVE MECHANISM WITH POSITIVE PINION-TO-RACK GEAR ENGAGEMENT

FIELD OF THE INVENTION

The invention relates to a reciprocating drive mechanism powered by a rotating prime mover for use, for example, in operating oil well pumps. The prime mover is coupled to an input shaft, the input shaft has a pinion coupled thereto, and an endless arcuate rack gear is rigidly coupled to an output shaft and meshes with the pinion. An arcuate cam is rigidly coupled to the arcuate rack gear and is engaged by a pair of cam followers, which are also coupled to the pinion, to provide a positive engagement between the pinion and rack gear.

BACKGROUND OF THE INVENTION

Reciprocating drive mechanisms have found considerable utility in oil well pumps since they can provide the required reciprocating pumping action with varying stroke length and speed. Typically, these reciprocating drive mechanisms comprise a rotating prime mover in the form of an internal combustion engine, a pinion rotated by the prime mover, a closed loop rack gear meshing with the pinion, and a drum coupled to the rack gear. From the drum, a cable extends to a polish rod and sucker rod used to pump the oil from the well. As is known, the pinion and rack gear combination converts the rotary motion from the prime mover into a reciprocating motion to reciprocate the polish and sucker rods.

One example of a recently developed reciprocating drive mechanism is disclosed in commonly assigned pending application Ser. No. 415,478, filed Sept. 7, 1982 in the name of Robert J. Smith and entitled Well Pumping Unit. This application discloses such a pinion and rack gear conversion system; however, this system has difficulties accomplishing the required reciprocating motion under heavy loads. Thus, it is typical to use a polish rod that weighs about 13,000 pounds and to have the entire polish and sucker rod system under loads that are greater than 50,000 pounds and can actually reach a million pounds. Under these loads, it has been found that the pinion tends to dig into the rack when rotation of the pinion is attempted and the pinion actually tries to move itself rather than the rack. In addition, the shaft holding the pinion actually tends to bend as the pinion tries to walk along the stationary rack.

Other examples of pinion and rack gear reciprocating mechanisms are disclosed in the following U.S. Patents: U.S. Pat. Nos. 264,483 to Smith; 579,559 to Bossert; 1,119,965 to Kelly; 1,211,221 to Pfeiffer; 1,598,553 to Butler; 1,611,914 to Jenkins; 2,091,287 to Leonard; 2,136,478 to Travis; 2,170,313 to Whittlesey; 2,200,292 to Patterson; and 2,732,722 to Wilshusen.

While these patents do disclose reciprocating drive mechanisms, typically they do not provide a pause or relaxation between the reciprocating movements, they cannot handle heavy loads, they are subject to significant wear patterns, and they are complicated to manufacture and have limited durability.

SUMMARY OF THE INVENTION

Accordingly, a primary object of the invention is to provide a reciprocating drive mechanism which is capable of reciprocating very heavy loads, is durable and is relatively simple and easy to construct.

Another object of the invention is to provide such a reciprocating drive mechanism that avoids significant wear patterns on the gears.

Another object of the invention is to provide such a reciprocating drive mechanism that maintains the pinion in positive engagement with the rack gear, even under extremely heavy loads.

The foregoing objects are basically attained by providing a reciprocating drive mechanism powered by a rotating prime mover, the combination comprising: a base; an output shaft rotatably coupled to the base; a wheel rigidly coupled to the output shaft; an arcuate cam rigidly coupled to the wheel and having an endless cam track; an arcuate rack gear rigidly coupled to the wheel and having an endless gear track with arcuate opposite ends; an input shaft coupled to the base for rotation, coupled to the rotating prime mover for rotation therewith and having a driving gear rigidly coupled thereto; a transmission shaft positioned parallel to the input shaft; a driven gear rigidly coupled to the transmission shaft, engaging the driving gear and being rotated by the driving gear; a pinion rigidly coupled to the transmission shaft and engaging the endless gear track; a first rigid support rotatably receiving the input and transmission shafts therein and maintaining the input and transmission shfts at a fixed distance apart; a second rigid support rotatably receiving the transmission shaft therein and having first and second cam followers rotatably coupled thereto and rotatably engaging the endless cam track; and a third rigid support rigidly interconnecting and coupled to the first and second supports, whereby rotation of the input shaft rotates the driving gear, which in turn rotates the driven gear, transmission shaft and pinion, and whereby rotation of the pinion reciprocates the arcuate rack gear, wheel and output shaft as the pinion traverses the entire extent of the endless gear track, the pinion walking around the endless gear track at the arcuate opposite ends thereof as the driven gear travels partially around the driving gear.

As is evident from the drawings, the two cam followers and the input shaft form an isosceles triangle of a fixed size and therefore the cam followers remain engaged with the cam track. Since the pinion is coupled to the first support, which also carries the cam followers, the pinion is maintained in positive engagement with the rack gear and thus the transmission shaft carrying the pinion does not bend, but rather remains perpendicular to the plane containing the rack gear.

Other objects, advantages and salient features of the invention will become apparent from the following detailed description, which, taken in conjunction with the annexed drawings, discloses a preferred embodiment of the invention.

DRAWINGS

Referring now to the drawings which form a part of this original disclosure.

DETAILED DESCRIPTION OF THE INVENTION

Figure 1:
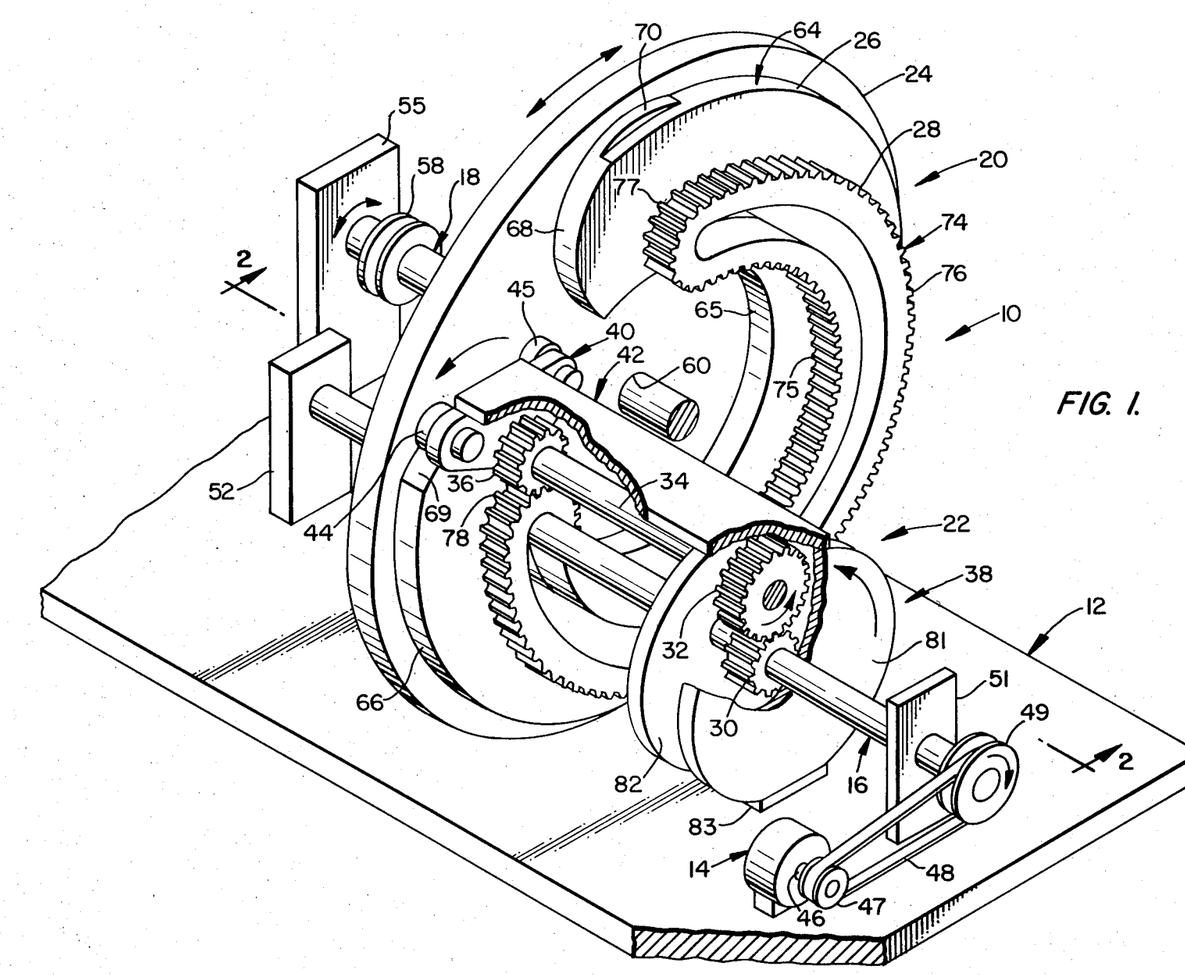
FIG. 1 is a left perspective, partially diagramatic view of the reciprocating drive mechanism in accordance with the invention, with parts broken away and bearings not shown for clarity.
Figure 2:
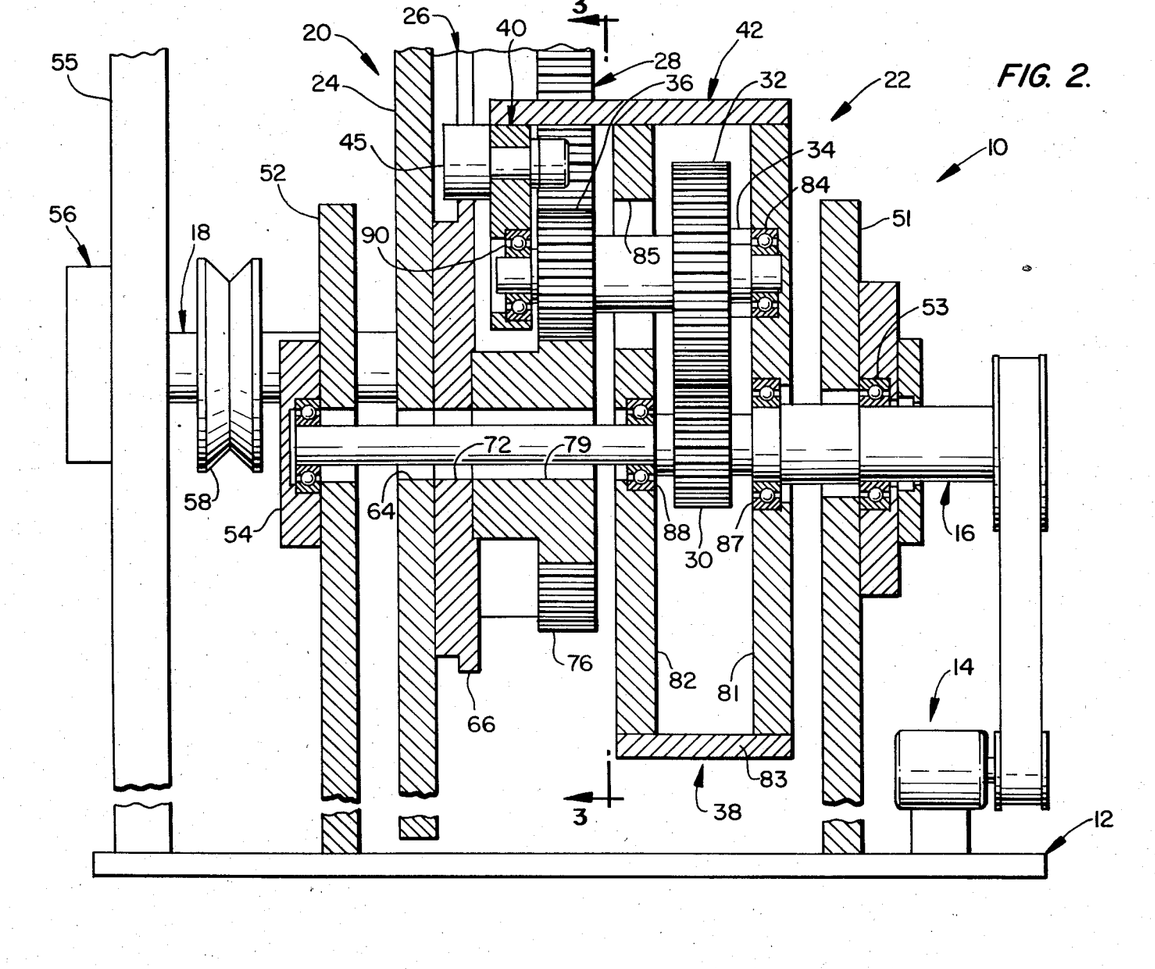
FIG. 2 is an enlarged side elevational view in section taken along line 2—2 in FIG. 1 showing in more detail the various elements of the reciprocating drive mechanism shown in FIG. 1 including the bearings.

As seen in FIGS. 1 and 2, the reciprocating drive mechanism 10 in accordance with the invention comprises a base 12, a rotating prime mover 14, an input shaft 16 and output shaft 18, a reciprocating assembly 20 and a transmission assembly 22. Rotation of the prime mover 14 results in rotation of the input shaft 16 which, via the transmission assembly 22, reciprocates the reciprocating assembly 20 and the output shaft 18 coupled thereto.

The reciprocating assembly 20 comprises a wheel 24 supported rigidly and centrally on the output shaft 18, an arcuate cam 26 rigidly coupled to the wheel, and an arcuate rack gear 28 also rigidly coupled to the wheel by being coupled to the cam. The transmission assembly 22 comprises a driving gear 30 rigidly coupled to the input shaft, a driven gear 32 meshing with the driving gear, a transmission shaft 34 rigidly coupled to the driven gear, and a pinion 36 rigidly coupled to the transmission shaft and in meshed engagement with the rack gear. The transmission assembly 22 further comprises a first support 38, a second support 40, and a third support 42, with the second support rotatably supporting first and second cam followers 44 and 45, which are in rotatable engagement with the arcuate cam. As will be described in more detail hereinafter, it is the combination of the cam followers, arcuate cam 26, input shaft 16 and first, second and third supports that provides the positive engagement of the pinion and the rack gear.

As seen in FIGS. 1–4, the base 12 is a substantially flat member or sled to provide a support to the overall drive mechanism. This base could also be the bottom of a housing enclosing the drive mechanism.

The rotating prime mover 14 is advantageously an internal combustion engine which is rigidly coupled to the base, although the prime mover can be any type of motor or engine capable of providing rotational movement. The prime mover has a drive shaft 46 with a pulley 47 at the end which has a transmission belt 48 thereon.

The input shaft 16 has a pulley 49 rigidly coupled at its end and receiving the transmission belt therein to provide rotation to the input shaft via the prime mover. Although a transmission belt system is shown, any type of transmission system for transmitting the rotational movement from the prime mover to the input shaft can be used. The input shaft 16 is itself rigid, i.e., not flexible, and has its central axis in a fixed location relative to the base by means of being only rotatably coupled to two posts 51 and 52, which are rigidly coupled to the base. The input shaft is rotatably secured in the posts via suitable bearings 53 and 54, shown in FIG. 2.

The output shaft 18 is also rigid, i.e., not flexible, and has its central axis in a fixed location relative to the base by being supported for only rotation via two posts, only post 55 being shown, these posts being rigidly coupled to the base. The output shaft 18 is suitably supported from the posts for rotation via bearings, only bearing 56 being indicated in FIG. 2. As seen in FIGS. 1 and 2, the input and output shafts are parallel and are a fixed distance apart. The output shaft 18 can have a pulley 58 or a drum rigidly coupled thereto for the reception of cable to reciprocate sucker and polish rods in a well pumping unit.

The reciprocating assembly 20 as seen in FIGS. 1 and 2 has as its central axis the output shaft 18, which is rigidly coupled thereto in a central aperture 60 in wheel 24, as seen in FIG. 1. Rather than coupling a cable to the output shaft, the cable could be coupled to the wheel which would then be in the form of a drum or pulley. As indicated in FIG. 2, an arcuate opening 64, which is concentric to the output shaft 18, is formed through the thickness of the wheel 24.

Figure 3:
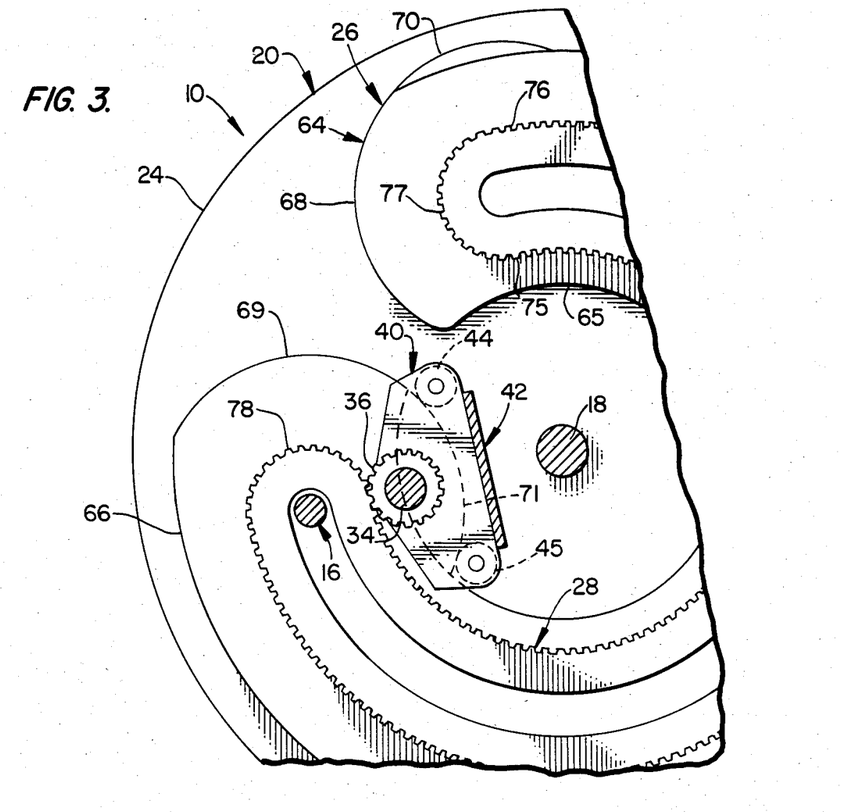
FIG. 3 is an enlarged fragmentary front elevational view in section taken along line 3—3 in FIG. 2 showing the pinion engaged with the arcuate rack gear and the two cam followers engaged with the arcuate cam.
Figure 5:
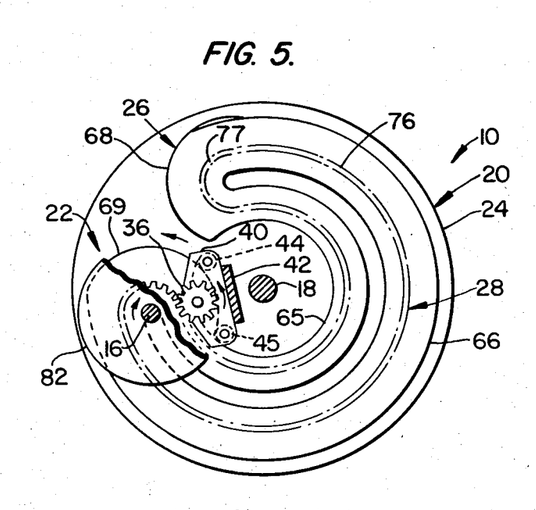
FIG. 5 is a front elevational view of the reciprocating drive mechanism showing the cam followers located on the inner run of the arcuate cam and about to traverse one of the ends of the cam, as the pinion traverses one of the arcuate ends of the rack gear.
Figure 6:
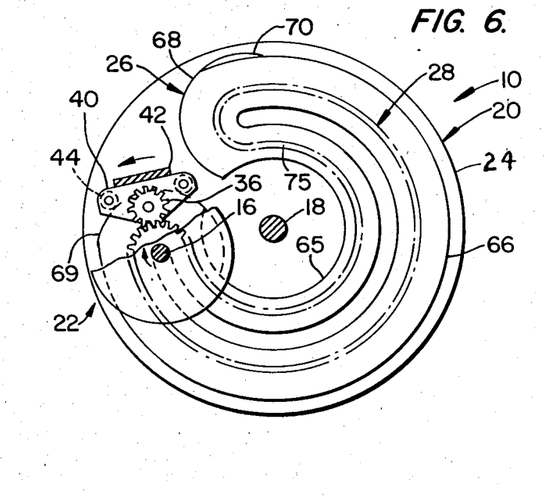
FIG. 6 is a front elevational view similar to that shown in FIG. 5 except that the cam followers have moved in the counter-clockwise direction on the cam and the pinion has also moved in the counter-clockwise direction on the rack gear, this drawing indicating a hesitation or lack of movement of the cam and rack gear during such movement of the cam followers and pinion.
Figure 7:
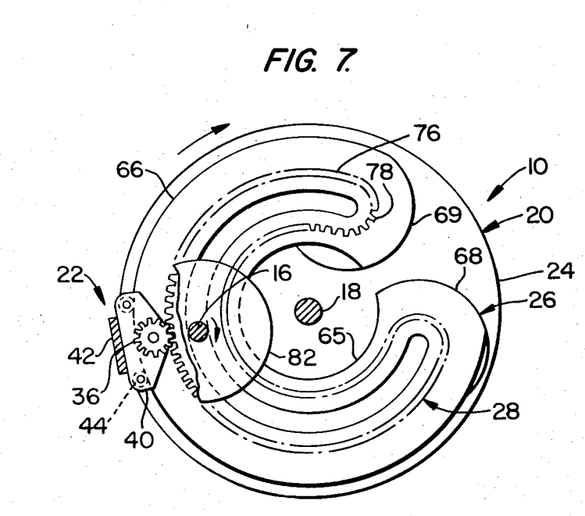
FIG. 7 is a front elevational view similar to that shown in FIG. 6 except that the rack gear and cam are being rotated in the clockwise direction as the cam followers and pinion engage the outer runs of the cam and rack gear.
Figure 8:
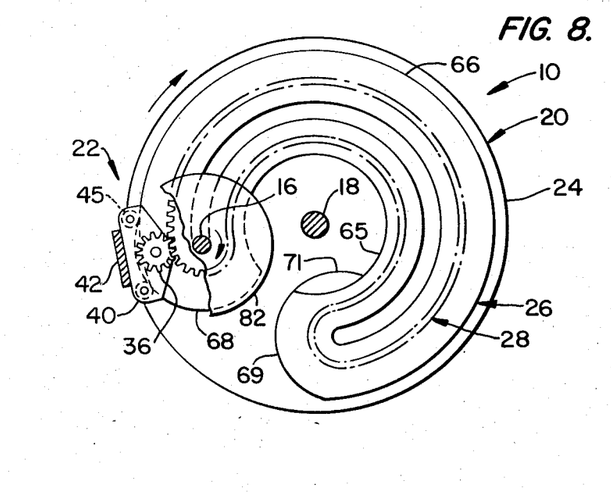
FIG. 8 is a front elevational view similar to that shown in FIG. 7 except that the rack gear and cam have reciprocated further in the clockwise direction.
Figure 9:
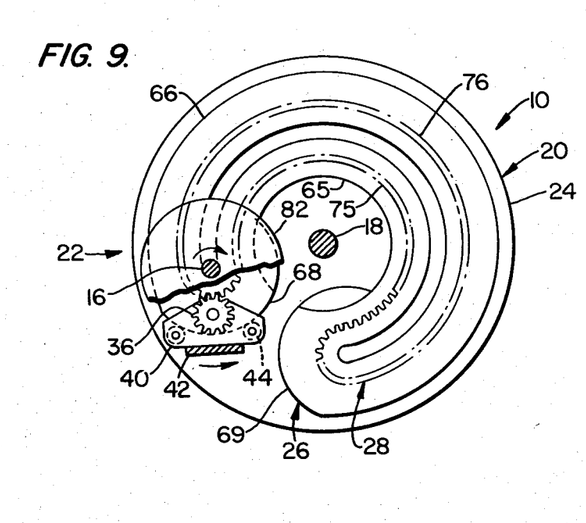
FIG. 9 is a front elevational view similar to that shown in FIG. 8 except that the rack gear and cam have halted their clockwise movement as the cam followers and pinion traverse the opposite ends of the cam and rack gear.
Figure 10:
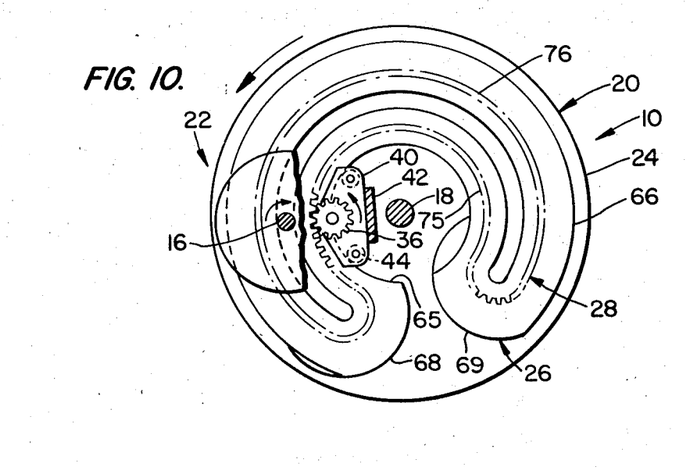
FIG. 10 is a front elevational view similar to that shown in FIG. 9 except that the rack gear and cam are now moving in the counter-clockwise direction as the cam followers and pinion traverse the inner runs of the cam and rack gear.
Figure 11:
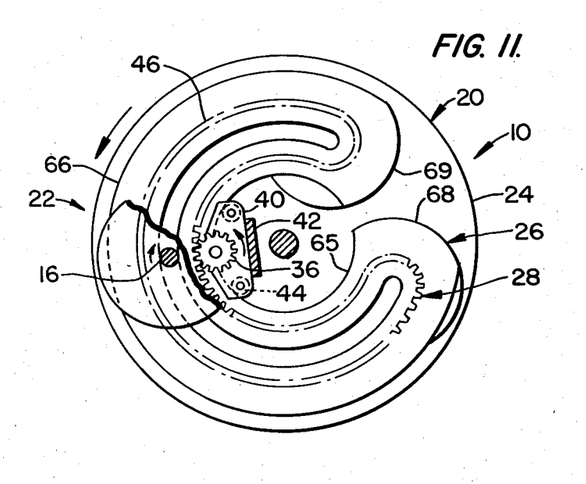
FIG. 11 is a front elevational view similar to that shown in FIG. 10 except that the rack gear and cam have continued to move in the counter-clockwise direction under the action of the pinion.

The arcuate cam 26 is planar and rigidly coupled to the wheel, such as by welding or bolting, and comprises an endless, or closed loop, smooth cam track 64 comprising an inner arcuate run 65, an outer arcuate run 66, a first arcuate end 68 and a second arcuate end 69, these arcuate ends interconnecting the inner and outer runs. As best seen in FIG. 3, on the outer run and adjacent arcuate end 68 is a first arcuate extension 70 and adjacent the other arcuate end 69 on the inner run is a second arcuate extension 71. These arcuate extensions are somewhat thinner than the overall thickness of the endless cam track and are meant to support the second or trailing cam follower 45 as the cams traverse the interface between the inner and outer runs and the arcuate ends as seen in FIGS. 3 and 5. As seen in FIG. 2, an arcuate opening 72 is also formed in the arcuate cam 26 coinciding with arcuate opening 64 in the wheel and through which the input shaft 16 extends.

The arcuate rack gear 28, as seen in FIGS. 1 and 2, comprises an endless, or closed loop, toothed gear track 74 which is in a single plane parallel to the plane of the cam track and which includes an inner run 75, an outer run 76, a first arcuate end 77 and a second arcuate end 78, these opposite ends interconnecting the inner and outer runs. The endless gear track 74 is concentrically located relative to the output shaft 18 and is rigidly coupled to the wheel via a rigid coupling to the arcuate cam, with the endless gear track being located at all points inside the endless cam track which it overlays. The configuration of the gear track is substantially the same as that of the cam track but smaller and all points of the gear track are substantially equidistant from the cam track. As seen in FIG. 2, the arcuate rack gear 28 also has an arcuate opening 79 therethrough which coincides with arcuate openings 72 and 64 in the arcuate cam and wheel.

As seen in FIGS. 1-3, the transmission assembly 22 includes the toothed driving gear 30 which is rigidly coupled to the input shaft 16. This input shaft, as discussed above, passes through the arcuate openings in the rack gear, cam and wheel and extends between posts 51 and 52. Alternatively, post 52 could be moved to the front of the wheel and the arcuate openings eliminated. The toothed driven gear 32 is in meshed engagement with the driving gear and rotates in the opposite, counterclockwise direction as indicated in FIG. 1 upon rotation of the input shaft and therefore the driving gear.

The transmission shaft 34 is itself rigid and has a central axis which is parallel to the central axis of the input shaft 16. The driven gear 32 is rigidly coupled to the transmission shaft, as is the pinion 36. The transmission and input shafts are located a fixed distance apart, as will be described in detail hereinafter.

The first support 38 as best seen in FIGS. 1 and 2 comprises a pair of parallel rigid flat plates 81 and 82 which are spaced apart and secured at the bottom by a bottom plate 83, which is rigidly coupled to these two plates by any suitable means such as welding or bolting. As seen in FIG. 2, plate 81 has a bearing 84 therein for rotatably supporting and receiving one end of the transmission shaft 34, whereas plate 82 has an aperture 85 therein through which the transmission shaft can freely pass. The first and second plates 81 and 82 also have suitable apertures and bearings 87 and 88 seen in FIG. 2 for the rotatable reception of the input shaft 16 therein. Thus, the first and second plates 81 and 82 in the first support 38 can rotate around the input shaft and the driving gear 30 while the transmission shaft 34 moves with the first and second plates but can rotate relative to them. In addition, these plates maintain the input and transmission shafts a fixed distance apart and parallel.

The second support 40, as seen in FIGS. 1-3, is a substantially flat plate having a bearing 90 therein for the rotatable reception of the transmission shaft 34, which is perpendicular thereto. Above the bearing 90, the first or leading cam follower 44 and the second or trailing cam follower 45 are rotatably supported in suitable bores and bearings in the first support 38. The central axes of the first and second cam followers, or rollers, are parallel to each other, and parallel to the transmission shaft and input shaft. The second cam follower 45 is slightly longer than the first cam follower so that it can engage the first and second arcuate extensions 70 and 71 on the cam. As best seen in FIG. 3, the central axes of the first and second cam followers are equidistant from the central axis of the transmission shaft and equidistant from the input shaft 16. In end view, as seen in FIG. 3, the central axes of the cam followers 44 and 45 and the input shaft 16 form an isosceles triangle of fixed area and configuration. The central axes of the cam followers are also a fixed distance apart due to the rigid nature of the first support 38.

The third support 42, as seen in FIGS. 1-3, is in the form of a rigid flat plate that is rigidly coupled, such as by welding or bolting, to both the first support 38 and the second support 40 to provide a rigid interconnection therebetween. Thus, any movement of the first support is translated into a corresponding movement of the second support, and therefore the cam followers, via the rigid third support.

Figure 4:
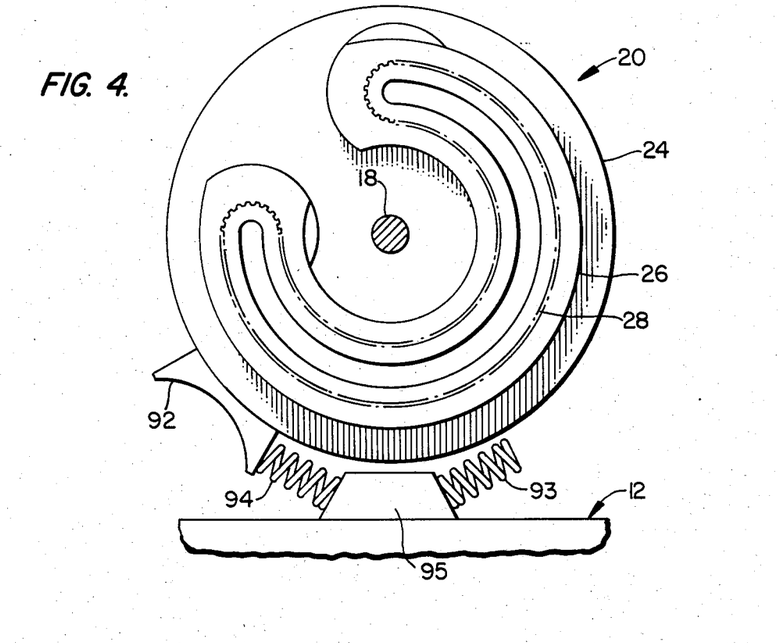
FIG. 4 is a front elevational view of the reciprocating assembly including a reversing mechanism having a stop and a pair of springs.

As illustrated in FIG. 4, the outer periphery of the wheel 24 has a stop 92 rigidly coupled thereto for alternate engagement with springs 93 and 94, which are in turn rigidly coupled to a support member 95 that is rigidly coupled to the base 12. The springs 93 and 94 provide a shock absorbing mechanism when the reciprocating assembly 20 finishes with each half of its reciprocating motion and also provide an initial force when the reciprocating assembly reverses direction.

OPERATION

Referring to FIGS. 1 and 2, it is seen that the purpose of the invention is to convert rotary motion from the rotating prime mover 14 into reciprocating motion of the wheel 24 and/or output shaft 18. Thus, the rotary motion from the rotating prime mover 14 is transferred via belt 48 to the input shaft 16 which rotates driving gear 30 in the clockwise direction as seen in FIG. 1. This results in a counter-clockwise rotation of the driven gear 32, the transmission shaft 34, and the pinion 36. Since the combination of the output shaft 18, wheel 24, arcuate cam 26, and rack gear 28 is free to rotate, rotation of the pinion 36 causes movement of the rack gear, and thus the cam, wheel and output shaft since the pinion 36 is engaged with the teeth on the rack gear. As the pinion traverses the entire extent of the endless gear track on the rack gear, the rack gear, cam and wheel will experience reciprocating movement.

This is indicated in the sequential drawings shown in FIGS. 5-11 wherein the wheel 24 moves in the clockwise direction when the pinion 36 engages the outer run 76 on the rack gear and moves in the counter-clockwise direction when the pinion 36 engages the inner run 75 of the rack gear.

In the transitional areas comprising the first and second arcuate ends 77 and 78 of the rack gear, illustrated in FIGS. 1, 3, 5, 6 and 9, there is a hesitation or relaxation of the reciprocating movement of the wheel 24 as the pinion 36 walks around such arcuate ends, at which time the driven gear 32 walks or travels partially around the driving gear, since the first support 38 supporting the driven gear is capable of such rotation, as it is not rigidly coupled to the base.

Since the cam followers 44 and 45 constantly engage the endless cam track in two places, and since they form triangular configurations with the input shaft and transmission shaft, these two cam followers are positively engaged with the cam track. Since the pinion 36 is coupled to the first support 38, which also carries the cam followers, the pinion 36 is also positively engaged with the teeth on the gear track, thereby preventing disengagement of the pinion from the gear track or a bending of the transmission shaft when the output shaft is under a heavy load. In other words, the transmission shaft remains substantially perpendicular to the plane containing the rack gear and thus rotation of the pinion results in movement of the rack gear. This positive engagement of the cam followers with the cam track and the pinion with the gear track is illustrated in FIGS. 5-11 as the pinion and cam followers have the gear track and cam track move relative thereto through the counter-clockwise and then clockwise reciprocating movement.

While one advantageous embodiment has been chosen to illustrate the invention, it will be understood by those skilled in the art that various changes and modifications can be made therein without departing from the scope of the invention as defined in the appended claims.

What is claimed is:

1. A reciprocating drive mechanism powered by a rotating prime mover, the combination comprising:
   a base;
   an output shaft rotatably coupled to said base;
   a wheel rigidly coupled to said output shaft;
   an arcuate cam rigidly coupled to said wheel and having an endless cam track;
   an arcuate rack gear rigidly coupled to said wheel and having an endless gear track with arcuate opposite ends;
   an input shaft coupled to said base for rotation, coupled to said rotating prime mover for rotation therewith and having a driving gear rigidly coupled thereto;
   a transmission shaft positioned parallel to said input shaft;
   a driven gear rigidly coupled to said transmission shaft, engaging said driving gear and being rotated by said driving gear;
   a pinion rigidly coupled to said transmission shaft and engaging said endless gear track;
   a first rigid support rotatably receiving said input shaft and said transmission shaft therein and maintaining said input shaft and said transmission shaft at a fixed distance apart;
   a second rigid support rotatably receiving said transmission shaft therein and having first and second cam followers rotatably coupled thereto and rotatably engaging said endless cam track; and
   a third rigid support rigidly interconnecting and coupled to said first and second supports,
   whereby rotation of said input shaft rotates said driving gear, which in turn rotates said driven gear, transmission shaft and pinion, and
   whereby rotation of said pinion reciprocates said arcuate rack gear, wheel and output shaft as said pinion traverses the entire extent of said endless gear track,
   said pinion walking around said endless gear track at said arcuate opposite ends thereof as said driven gear travels partially around said driving gear,
   said endless gear track being located inside said endless cam track,
   said first and second cam followers and said transmission shaft having parallel central axes,
   the central axes of said transmission shaft, said first cam follower, and said second cam follower defining the three points of a triangle in end view.

2. A reciprocating drive mechanism according to claim 1, wherein
   said endless cam track comprises an inner run and an outer run connected by first and second arcuate ends,
   said outer run having a first arcuate extension adjacent one of said ends, and
   said inner run having a second arcuate extension adjacent the other of said ends.

3. A reciprocating drive mechanism according to claim 2, wherein
   said second cam follower is longer than said first cam follower and engages said first and second arcuate extensions as said rack gear and cam move relative to said pinion.

4. A reciprocating drive mechanism according to claim 1, wherein
   said wheel, arcuate cam and arcuate rack gear have the same central axis which coincides with the central axis of said output shaft.

5. A reciprocating drive mechanism according to claim 1, wherein
   said wheel, arcuate cam and arcuate rack gear have an arcuate opening formed therethrough,
   said arcuate opening receiving said input shaft therein.

6. A reciprocating drive mechanism according to claim 1, wherein
   said first rigid support comprises a pair of spaced plates.

7. A reciprocating drive mechanism according to claim 1, wherein
   said third rigid support comprises a rigid plate.

8. A reciprocating drive mechanism according to claim 1, wherein
   said input shaft is substantially parallel to said output shaft.

9. A reciprocating drive mechanism according to claim 1, wherein
   said input shaft is rigid.

10. A reciprocating drive mechanism according to claim 1, wherein
    said transmission shaft is rigid.

11. A reciprocating drive mechanism according to claim 1 and further cmprising
    means, coupled to said base and to said input shaft, for maintaining the central axis of said input shaft in a fixed position.

12. A reciprocating drive mechanism according to claim 1, wherein
    the central axes of said input shaft, said first cam follower and said second cam follower are parallel.

13. A reciprocating drive mechanism according to claim 12, wherein
    the central axes of said input shaft, said first cam follower and said second cam follower define the three points of a triangle in end view.

14. A reciprocating drive mechanism powered by a rotating prime mover, the combination comprising:
    a base;
    an output shaft;
    a cam coupled to said output shaft and having an endless cam track;
    a rack gear rigidly coupled to said cam and having an endless gear track with arcuate opposite ends;
    an input shaft coupled to said base for rotation, coupled to said rotating prime mover for rotation therewith and having a driving gear rigidly coupled thereto;
    a transmission shaft positioned parallel to said input shaft;

a driven gear rigidly coupled to said transmission shaft, engaging said driving gear and being rotated by said driving gear;

a pinion rigidly coupled to said transmission shaft and engaging said endless gear track;

a first rigid support rotatably receiving said input shaft and said transmission shaft therein and maintaining said input shaft and said transmission shaft at a fixed distance apart;

a second rigid support rotatably receiving said transmission shaft therein and having first and second cam followers rotatably coupled thereto and rotatably engaging said endless cam track; and a third rigid support rigidly interconnecting and coupled to said first and second supports, whereby rotation of said input shaft rotates said driving gear, which in turn rotates said driven gear, transmission shaft and pinion, and whereby rotation of said pinion reciprocates said rack gear, and output shaft as said pinion traverses the entire extent of said endless gear track, said pinion walking around said endless gear track at said arcuate opposite ends thereof as said driven gear travels partially around said driving gear, said endless gear track being located inside said endless cam track, said first and second cam followers and said transmission shaft having parallel central axes, the central axes of said transmission shaft, said first cam follower, and said second cam follower defining the three points of a triangle in end view.

* * * * *